Sept. 27, 1932.  S. NASH  1,879,422
ROTARY ENGINE
Filed March 17, 1930  3 Sheets-Sheet 1
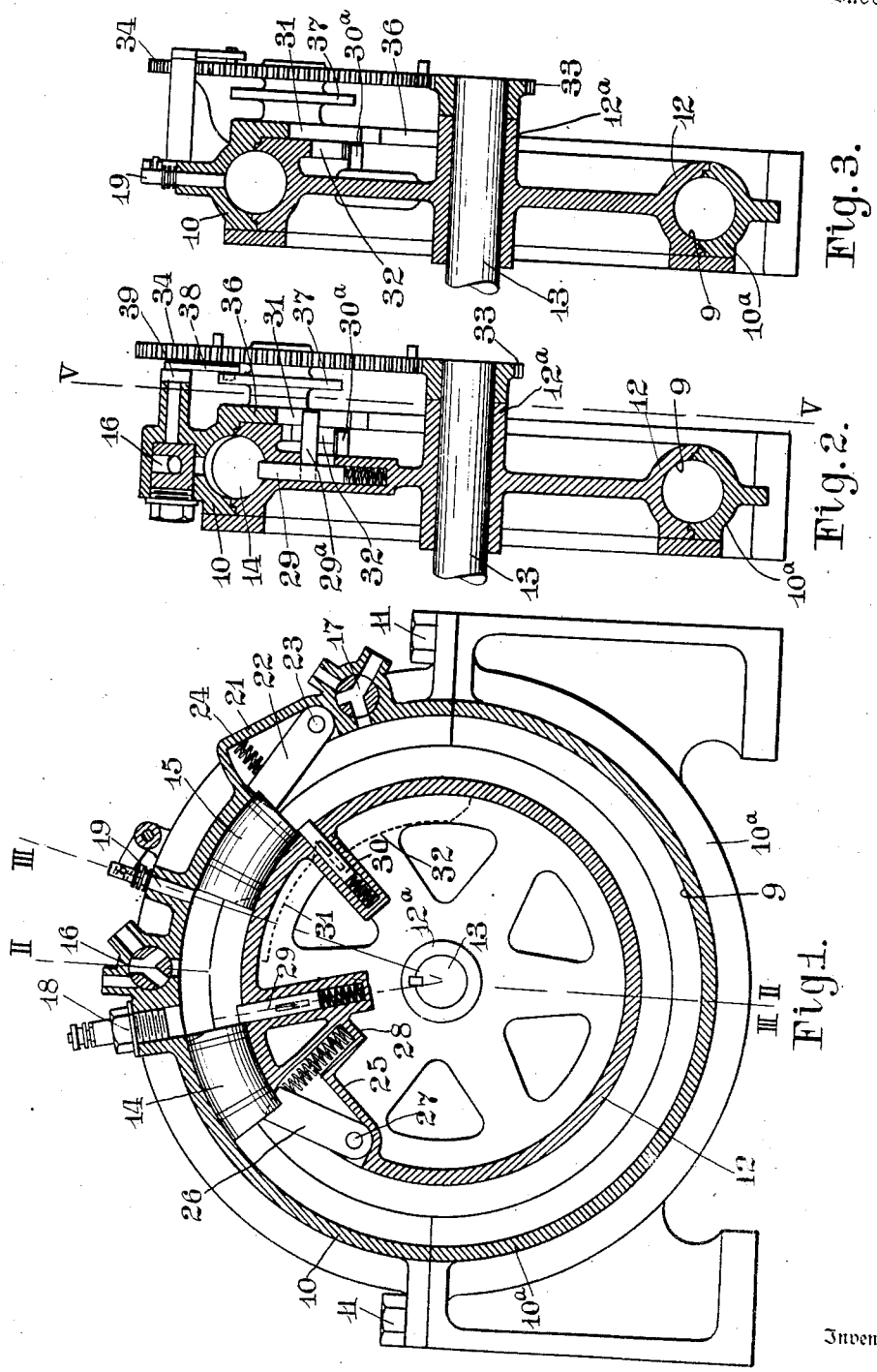
Inventor
SIMEON NASH

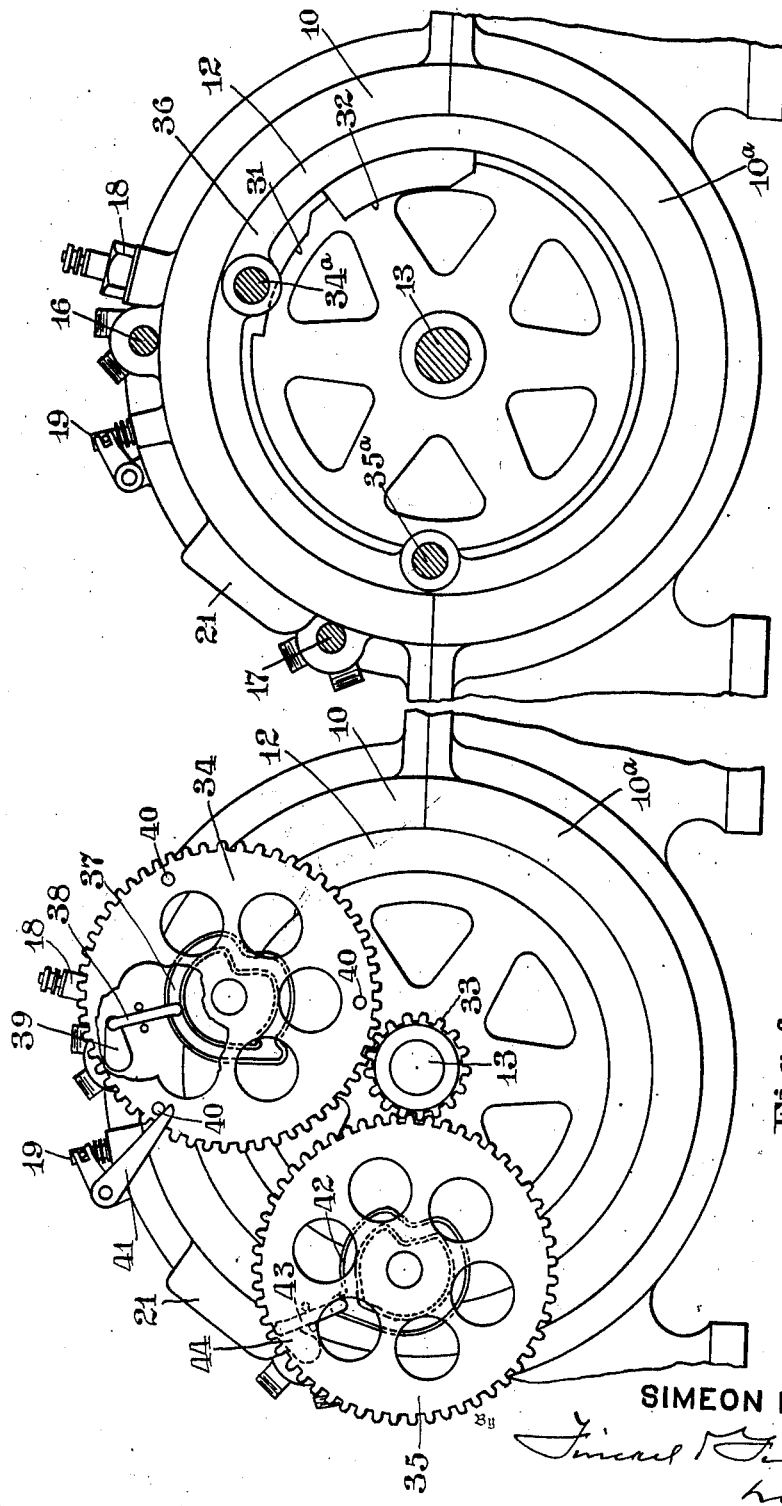

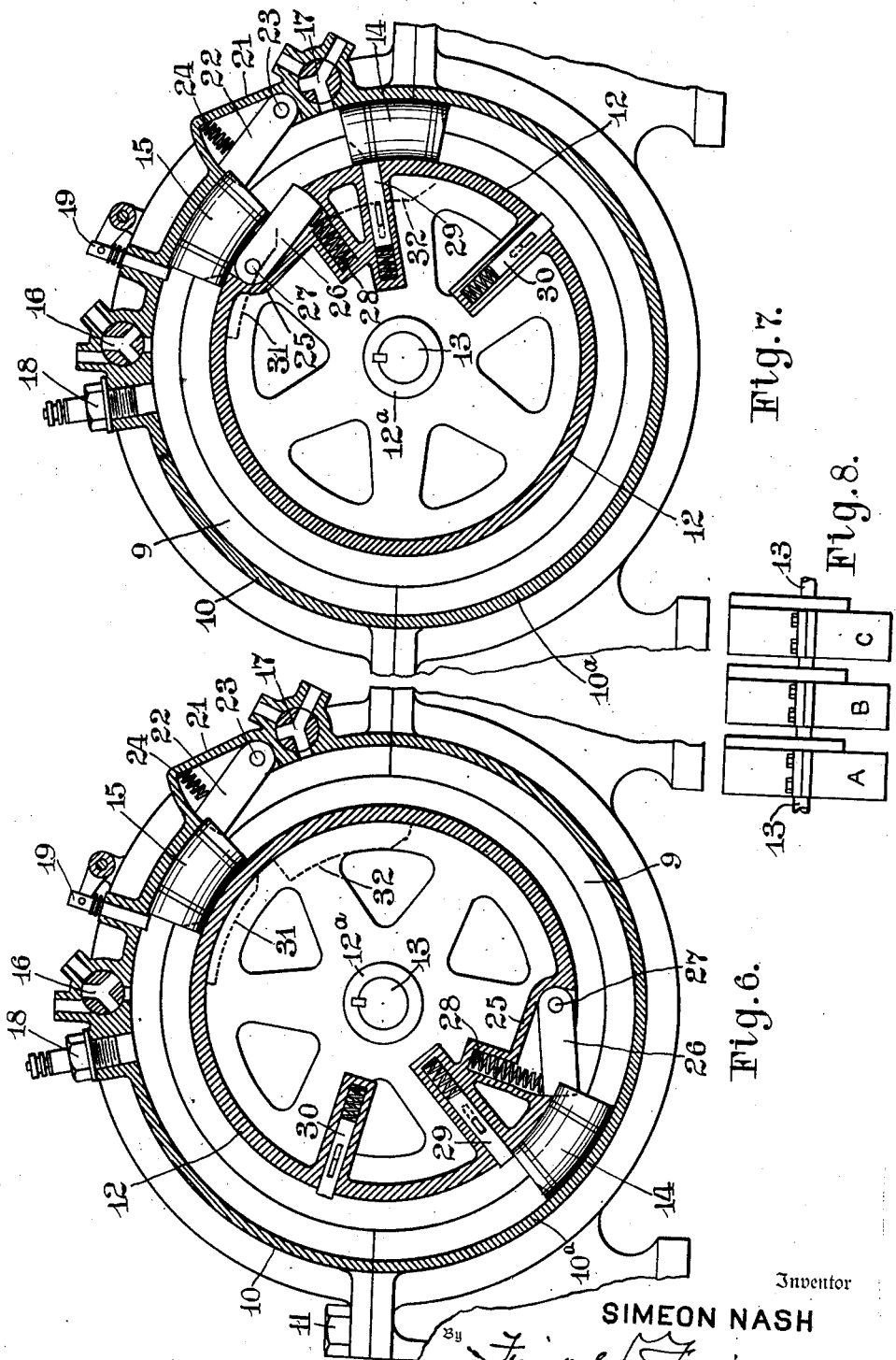

Patented Sept. 27, 1932

1,879,422

UNITED STATES PATENT OFFICE

SIMEON NASH, OF COLUMBUS, OHIO

ROTARY ENGINE

Application filed March 17, 1930. Serial No. 436,346.

The invention relates to rotary engines and more especially to such as use an explosive gas as the propelling agent.

The principal object of the invention is an improved engine of this species whereby the construction and operation are simplified and the power is more effectively applied. Other objects will appear from the disclosure herein.

According to the invention and generally stated there is employed a piston chamber formed of two circular parts having circular grooves matched together to form a piston chamber circular in cross section, one of which parts is stationary and the other rotary, and two floating pistons impelled alternately around the chamber, means being provided to temporarily connect and hold one of the pistons to said stationary part to act as a buffer while the other piston is temporarily connected with the rotary part to receive the moving impact of the propelling agent.

The invention is embodied in the example herein shown and described, the features of novelty being finally claimed.

In the accompanying drawings—

Figure 1 is a sectional view centrally in the plane of the piston chamber with parts in full.

Fig. 2 is a cross section on the line II—II Fig. 1.

Fig. 3 is a cross section on the line III—III Fig. 1.

Fig. 4 is an elevation looking at the rear side of Fig. 1 and further illustrating the mechanism indicated at the right hand side of Figs. 2 and 3.

Fig. 5 is a sectional view on the line V—V Fig. 2 looking to the left.

Fig. 6 is a view like Fig. 1 showing a position of the piston and rotor after an explosion.

Fig. 7 is a similar view showing a further advance of the piston and the position of parts operating the piston after the effect of the gas explosion.

Fig. 8 is a diagrammatic view illustrating how three of the engines can be secured to one shaft.

In the views the stationary part or stator forming the outer part of the piston chamber which is circular in cross section as shown at 9, is composed of two parts 10 and 10ª bolted together at 11. The rotated part or rotor of the combustion chamber is preferably a single ring 12 having spokes and a hub 12ª for connecting the rotor with a shaft 13 that is to be driven. The joint between the stator and rotor is formed and gasketed so as to make the ring-like piston chamber as gas tight as practicable. In the present instance the engine is designed so that the rotor is rotated in the anti-clockwise direction as viewed in Fig. 1.

The two pistons are designated 14 and 15, these being short blocks in the form of segments of the piston chamber and provided with elastic piston rings, the latter, as usual in explosion engine pistons, so as to make a close fit with the walls of the piston chamber. These pistons have short curved notches in their ends as shown in broken lines into which suitable dogs project in the operation of the engine.

At 16 in the stator is a rockable three-way valve constructed and adapted to be rocked at proper intervals to admit the explosive gas, to close the gas inlet prior to the explosion, and subsequently to admit cooling air.

At 17 in the stator is another rockable three-way valve constructed and adapted to be turned at the proper intervals to exhaust burnt gas, close the outlet from the piston chamber in the gas compression cycle and direct the exhaust cooling air either to the atmosphere or to an air compression chamber as may be desired and as will be hereinafter explained.

At 18 in the stator near the valve 16 is an ordinary electrical spark plug, wiring and timing means for which (not shown) is provided for as usual in gas engine practice.

At 19 is a spring actuated pin to be held normally out of the piston chamber but adapted to be projected in front of a piston, means being provided for moving it in front of a piston at the proper intervals to temporarily hold it, as hereinafter explained.

In a suitable housing 21 on the stator is a stout abutment dog 22 pivoted at 23 and normally yieldingly projected into the piston chamber by spring 24 in the housing, the function of said dog being to hold the piston to resist the back thrust of the explosion.

In a suitable housing 25 on the rotor is another stout abutment dog 26 pivoted at 27 and normally yieldingly projected into the piston chamber by a spring 28 in the housing, the function of said dog 26 being to operably connect the piston 14 with the rotor to impel that member when the gas charge between the two pistons is fired. The abutment dogs 22 and 26 are adapted to be shoved out of the piston chamber by the pistons in the operation.

Confined in a suitable housing is a spring actuated carrier pin 29 positioned in the rotor to normally stand next the rear end of the piston when one is abutted against the dog 26; and suitably confined in a suitable housing in the rotor is a spring actuated carrier pin 30 positioned in the rotor to normally stand next the rear of the piston that at the time is abutted against the dog 22.

These carrier pins have laterally projecting pins 29a and 30a respectively, projecting through the wall of the rotor and actuated by cams 31 and 32, respectively, offset from each other on the stator to withdraw the end of the pins 29 and 30 from the piston chamber at the time hereinafter referred to.

Secured on the shaft 13 (or to the hub of the rotor) is a pinion 33 that engages large spur gears 34 and 35 journaled on stud shafts 34a and 35a on an annular fixed flange 36 projecting from the stator.

The gear wheel 34 is provided with a cam 37 around its axis, said cam formed to rock or actuate the three-way intake valve 16, first to admit the explosion gas, then close said intake for firing and then open the intake for cool air, all by means of a link 38 engaging the cam and connected with a rock arm 39 on said valve 16. Said gear wheel 34 is also provided on its face with three pins 40 spaced 120 degrees apart to strike arm 41.

The gear wheel 35 is provided with a cam 42 around its axis formed to rock or actuate the three-way exhaust valve 17, first to exhaust cool air, then to exhaust the burnt gases and then to close said valve for the compression of the gas charge by means of a guided link 43 engaging the cam and connected with a rock arm 44 on said valve 17. The exhaust valve 17 has two distinct outlets, one of which is for the exhaust of burnt gas and the other for the cooling air. The exhaust for the cooling air may have connectible with it, when desired, a reservoir for storing compressed air created by the engine, but this is not a part of the subject of the present application, hence is not shown in detail.

In the first or explosion cycle when the piston 14 advances to the position shown in Fig. 7 the carrier pin 29 is withdrawn by cam 32 from said piston 14 and said piston picked up by carrier pin 30 while carrier pin 29 picks up piston 15 and both pistons carried in spaced relation to the positions shown in Fig. 1, except that piston 14 now occupies the place of piston 15 of said Fig. 1. When in this position the abutment stop 19 is projected by a pin 40 to retain piston 14 against accidental forward movement by friction of the moving rotor.

On the next cycle the piston 15, now at the position of 14, Fig. 1 sucks in gas behind it through valve 16 and scavenges the burnt exhaust in front of it through opened valve 17.

On the third cycle the pistons again change their relation and to the position shown in Fig. 1 and upon rotation of the rotor the piston 14 compresses the gas in front of it, the valve 17 being closed and sucks in fresh cooling air behind it through valve 16. Upon the termination of this cycle and when the pistons are as shown in Fig. 1 the gas is fired and the first cycle repeated.

If but one of the structures shown and described is employed to drive a shaft, a fly wheel would be desirable to carry the rotor over through two of the cycles, but by connecting three of the units shown at A, B and C in Fig. 8 with a single shaft 13 with the explosion point occuring 120 degrees apart in succession the application of rotative force to the shaft is practically continuous and a fly wheel would not be needed.

The operation of the engine as here shown and set forth may be briefly described as follows: Counting the explosion operating period as the first cycle it may be presumed that the piston chamber in advance of the piston 14 (Fig. 1) is filled with cool air taken in at a previous cycle.

Upon the explosion with the parts as seen in Fig. 1 the rotor is impelled by the pressure of the piston 14 on the abutment 26, at the same instant the carrier pin 30, of course, is withdrawn from the rear of piston 15, and the advancing piston expels the cool air from the piston chamber through the exhaust as indicated in Figs. 4 and 5. The bell crank lever 41 connected with pin 19 depresses the latter in front of the rear piston to hold that piston while the rotor passes under it upon an explosion.

The operation of the mechanism is the same in all three cycles except that in the second the valve 17 is closed to permit the compression of the gas by the advancing piston against the held piston. This can be readily understood by considering the position of the piston shown in Fig. 6 and imagining the exhaust valve 17 closed. Because the valve 15 is held by the stator, gas in front of the advancing piston 14 will be compressed between the pistons. When the advancing piston reaches the point as shown in Fig. 7 the carrier pin 29 is withdrawn, the dog 26 carried under the held piston to a stopping position in front of the held piston. The carrier pin 30 arrests piston 14 against any back compression and carries said piston forward while the carrier pin 29, upon the removal of the pin 19, picks up the held piston 15 thereby placing the two pistons in the positions seen in Fig. 1 but transposed.

The air cooling and compression cycles can be dispensed with by introducing a compressed impelling agent when the pistons are in the position shown in Fig. 1, but some change in the mechanism will, of course, be required to convert the engine, as shown, from a three cycle to a single cycle operation.

Any suitable external means for radiating or conducting the heat away and keeping the engine appropriately cool can be employed.

The forms of the parts can be changed without departing from the gist of the invention as claimed.

What I claim is:

1. In an engine of the class described having an interior rotor and an exterior stator forming between them an annular piston chamber, a pair of floating pistons in said piston chamber, a spring actuated abutment carried by the rotor for engagement by the front of the propelled piston, and a cam actuated carrier spacer pin carried by the rotor for engaging the rear of said piston, a spring actuated abutment mounted in the stator for the rear of the other piston and a cam actuated carrier spacer pin carried by the rotor for the rear of said latter piston.

2. In an engine of the class described having an interior rotor and an exterior stator forming between them an annular piston chamber, a pair of floating pistons in said piston chamber, a spring actuated abutment carried by the rotor for engagement by the front of the propelled piston, and a cam actuated carrier spacer pin carried by the rotor for engaging the rear of said piston, a spring actuated abutment mounted in the stator for the rear of the other piston, a cam actuated carrier spacer pin carried by the rotor for the rear of said other piston, and a cam actuated stop pin also mounted in the stator for the front of said last named piston.

3. In an engine of the class described having an interior rotor and an exterior stator forming between them an annular piston chamber, a pair of floating pistons in said piston chamber, a spring actuated abutment carried by the rotor for engagement by the front of the propelled piston, and a cam actuated carrier spacer pin carried by the rotor for engaging the rear of said piston, a spring actuated abutment mounted in the stator for the rear of the other piston, a cam actuated carrier spacer pin carried by the rotor for the rear of said other piston, a cam actuated stop pin also mounted in the stator for the front of said last named piston, and a fuel intake mounted in the stator in advance of but in proximity to said last named stop pin.

4. In an engine of the class described having an interior rotor and an exterior stator forming between them an annular piston chamber, a pair of floating pistons in said piston chamber, a spring actuated abutment carried by the rotor for engagement by the front of the propelled piston, and a cam actuated carrier spacer pin carried by the rotor for engaging the rear of said piston, a spring actuated abutment mounted in the stator for the rear of the other piston, a cam actuated carrier spacer pin carried by the rotor for the rear of said piston and a cam actuated stop pin also mounted in the stator for the front of said last named piston, a sparking device and a fuel and air intake and valve therefor in said stator located in advance of but in proximity to said last named cam actuated stop pin, and means for alternating the intake of fuel and air to said chamber.

5. In an engine of the class described, an interior rotor and an exterior stator forming between them an annular piston chamber, a pair of floating pistons in said piston chamber, a spring actuated abutment carried by the rotor for engagement with the front of the propelled piston and a cam actuated carrier spacer pin for the rear of said piston, a spring actuated abutment mounted in the stator for the rear of the other piston, and a cam actuated carrier spacer pin carried by the rotor for the rear of said other piston, and a cam actuated stop pin also mounted in the stator for the front of said piston, a sparking device and a fuel and air intake in said stator located in advance of but in proximity to said last named cam actuated stop pin, means for alternating the intakes of fuel and air to said piston chamber, an exhaust discharge in said stator in rear of said last named cam-operated stop pin, and a cam actuated valve for said exhaust discharge to close the same when fuel compression is to be effected in said piston chamber.

6. In an engine of the class described, an interior rotor and an exterior stator forming between them an annular piston chamber, a pair of floating pistons in said piston chamber, a spring actuated abutment carried by the rotor for engagement with the front of the propelled piston and a cam actuated carrier spacer pin for the rear of said piston, a spring actuated abutment mounted in the stator for the rear of the other piston, and a cam actuated carrier spacer pin carried by the rotor for the rear of said other piston, a cam actuated stop pin also mounted in the stator for the front of said piston, a sparking device and a fuel and air intake in said stator located in advance of but in proximity to said last named cam actuated stop pin, means for alternating the intakes of fuel and air to said piston chamber, an exhaust discharge in said stator in rear of said last named cam-operated stop pin, a cam actuated valve for said exhaust discharge to close the same when fuel compression is to be effected in said piston chamber and timed means for opening and closing said exhaust.

7. In an engine of the class described having a rotor and a stator forming between them an annular piston chamber, a pair of floating pistons in said piston chamber, a movable abutment carried by the rotor for engagement by the front of the propelled piston, a reciprocated spacer pin carried by the rotor for engaging the rear of said piston, a movable abutment mounted in the stator for the rear of the other piston, an arresting pin in the stator for the front of said last named piston and means for moving the same into and out of piston arresting position, and a reciprocated carrier spacer pin carried by the rotor for the rear of said last named piston.

SIMEON NASH.